May 9, 1961 W. L. MORRISON 2,983,108
SELF-SERVICE DISPLAY COUNTER
Filed May 29, 1957 4 Sheets-Sheet 1
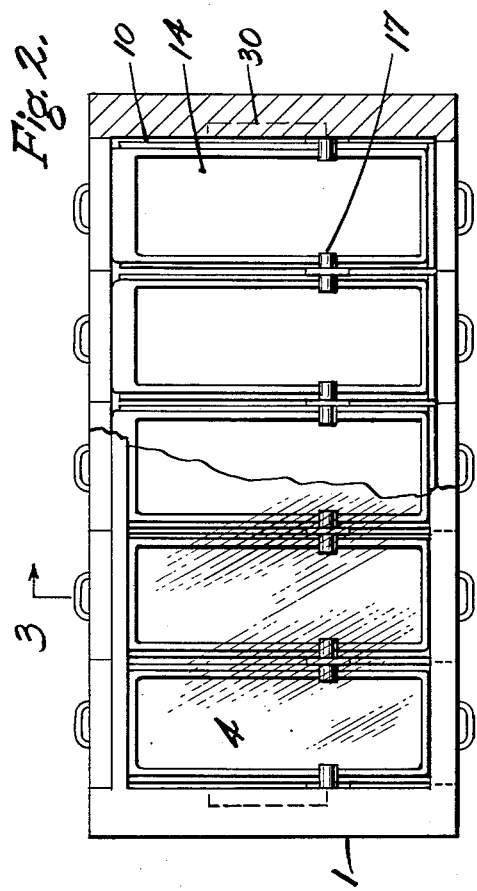
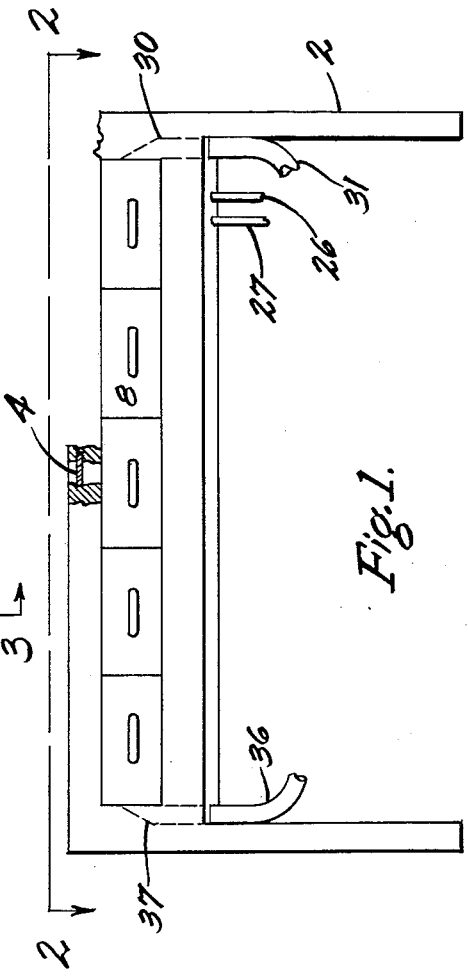
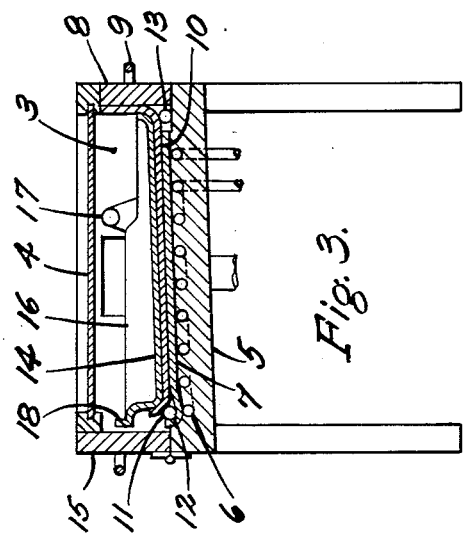
INVENTOR.
WILLARD L. MORRISON
BY PARKER & CARTER
ATTORNEYS May 9, 1961 W. L. MORRISON 2,983,108
SELF-SERVICE DISPLAY COUNTER
Filed May 29, 1957 4 Sheets-Sheet 2

INVENTOR.
WILLARD L. MORRISON
BY PARKER & CARTER
ATTORNEYS

May 9, 1961

W. L. MORRISON 2,983,108

SELF-SERVICE DISPLAY COUNTER

Filed May 29, 1957

INVENTOR.
WILLARD L. MORRISON
BY PARKER & CARTER
ATTORNEYS

INVENTOR.
WILLARD L. MORRISON
BY PARKER & CARTER
ATTORNEYS

United States Patent Office 2,983,108
Patented May 9, 1961

2,983,108

SELF-SERVICE DISPLAY COUNTER

Willard Langdon Morrison, Lake Forest, Ill., assignor to The Union Stock Yard and Transit Company of Chicago, Chicago, Ill., a corporation of Illinois Filed May 29, 1957, Ser. No. 662,531

6 Claims. (Cl. 62—62)

My invention relates to method of and apparatus for chilling or freezing and thereafter exposing for inspection and retail sale foodstuffs such as meat and the like.

One object of the invention is to provide means for chilling or freezing the material by direct contact with a cold surface and to simultaneously expose the material to a cold, preferably saturated atmosphere.

Another object of my invention is to lower the temperature of the material in question without substantial desiccation by maintaining it in heat exchange relationship with a cold surface and exposing it to heat exchange relationship with a cold air under circumstances such that the temperature of the cold surface will be above the temperature of the air or to put it in another way, will be above the dew point of the air so that the air and the cold surface cooperate in maintaining the material at the desired temperature without frosting or condensation taking place on the foodstuff itself or on the cold surface.

Another object of my invention is to display the material and maintain it at the desired temperature under circumstances such that until the material is to be withdrawn for purchase, it will be protected from contact with the ambient air and therefore contamination will be avoided.

Another object of the invention is to accomplish this under circumstances such that the temperature and moisture content of the air to which the foodstuffs are exposed is to a minimum extent interfered with by and to a minimum extent responsive to the ambient temperatures prevailing around the area in which the material is exposed.

Another object of the invention is to provide a display counter where the air to which the food on display is exposed, can be maintained within a close range of temperature and moisture content.

Another object of the invention is, in a refrigerating counter, to protect the foodstuffs on display until withdrawal by the purchaser against contact with ambient atmosphere.

Another object of the invention is to provide a refrigerating display counter where the goods on display are completely enclosed until the customer withdraws them.

Another object is to provide a retail sales case so that the food products are readily accessible to whomever passes through the aisle in front of the display case, while permitting a plurality of customers to have simultaneous access to the contents.

Other objects will appear from time to time throughout the specification and claims.

Since display counters of the type proposed are habitually found in markets and such places where room ventilating cooling fans discharge large volumes of air at high speed are usual, and since customers are subject to an involuntary sneezing and coughing and suffer from the common cold and the like, it is highly important to prevent goods on display from coming in contact with atmospheric air thus contaminated. I therefore propose to provide a counter having a transparent top, wall or door through which the material may be seen. This will provide a closed chamber in which the foodstuffs may be displayed and through which the controlled air will circulate. I propose to so arranged the counter that the customer may open a part of the top or open a drawer as the case may be for the purpose of withdrawing the articles to be purchased.

Such periodic opening will permit some escape of the temperature and moisture controlled air of the counter but such escape can easily be compensated for by properly providing for the proper volume of moist air supply through the counter.

The opening and closing by the customer of whatever opening is used will to some extent cause variation in the temperature of the air in the counter and to some extent might cause variation in the temperature of the material in the counter. The use of a cold surface in contact with the material in addition to the controlled air tends to damp out such temperature variations because opening and closing the door will have little if any effect on the temperature of the product resting on the cold surface.

Within the counter will be a plurality of slides or trays on which the foodstuff is displayed and by which it is supported. The trays may be withdrawn through a port in the front of the counter by the customer in order to take out articles to be purchased or if desired, the counter top or a part thereof or a plurality of sections may be separately pivoted so that the customer having looked through the top may open it to take out the particular item desired.

My invention is illustrated more or less diagrammatically in the accompanying drawings, wherein—

Figure 1 is a diagrammatic side elevation of the display counter with parts in section and parts omitted.

Figure 2 is a plan view of the counter of Figure 1 with parts in section and parts omitted;

Figure 3 is a section along the line 3—3 of Figure 2.

Like parts are indicated by like characters throughout the specification and drawings.

Figure 4:
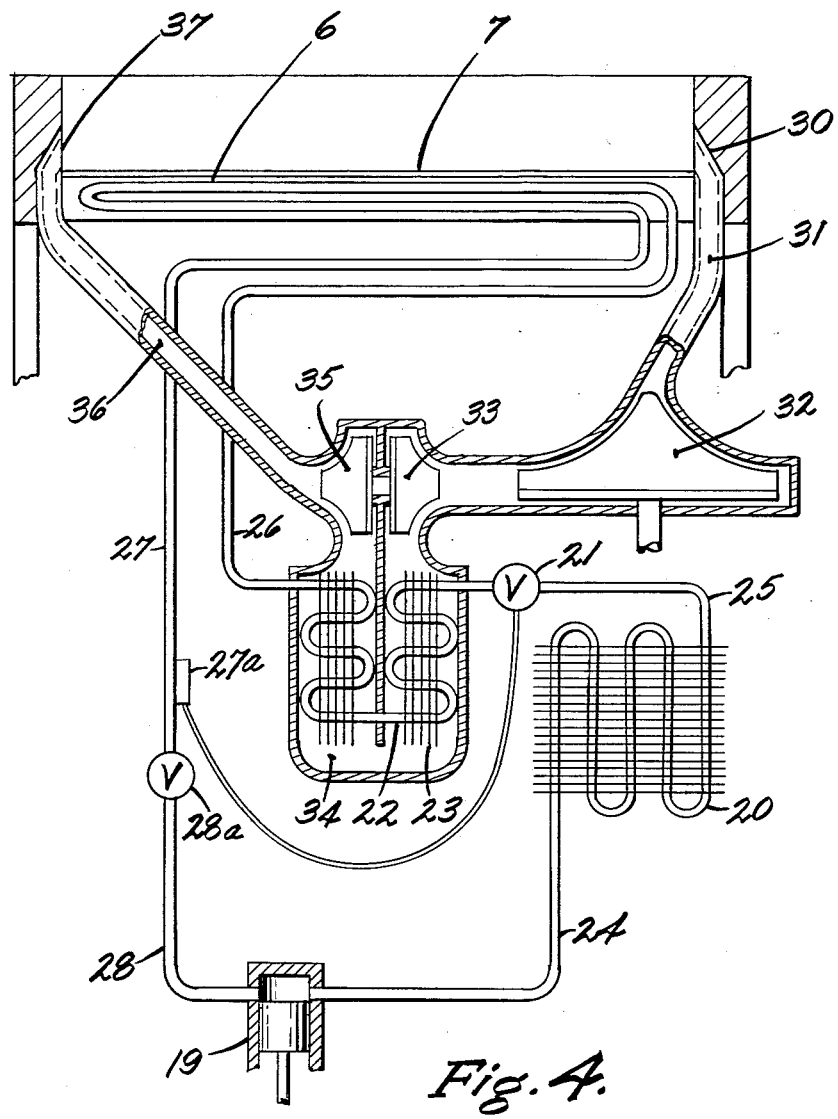
Figure 4 is a diagrammatic flow sheet illustrating the refrigeration system.
Figure 5:
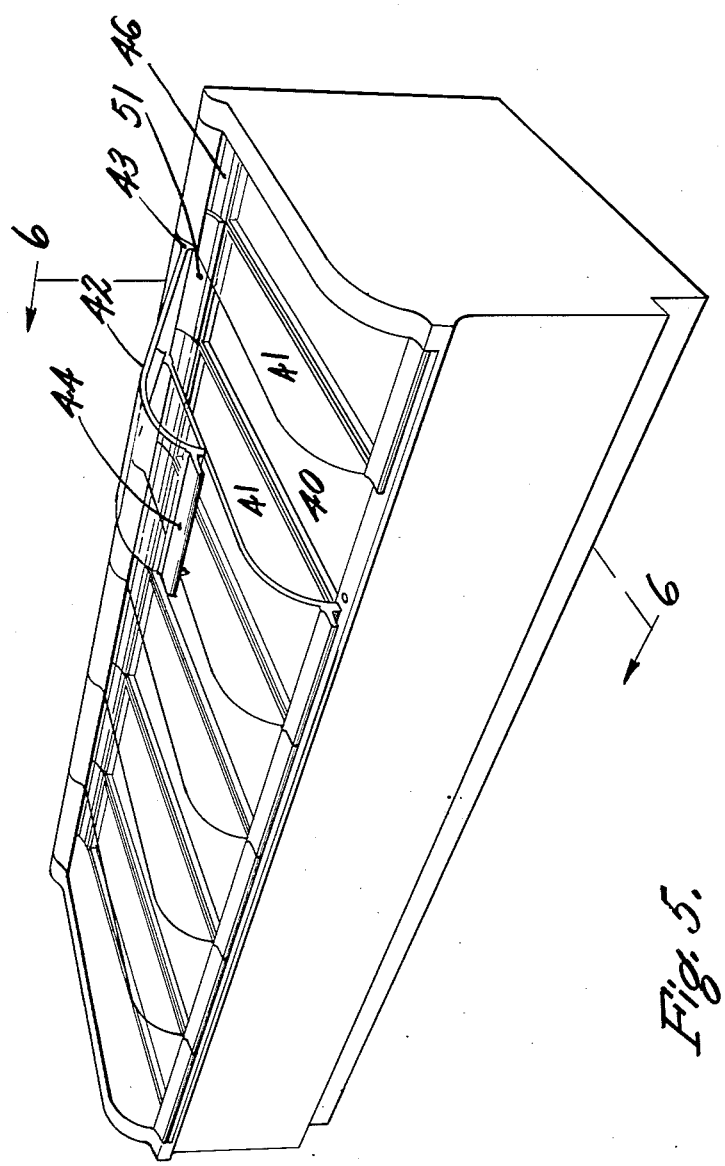
Figure 5 is a perspective view of a modified form of counter.
Figure 6:
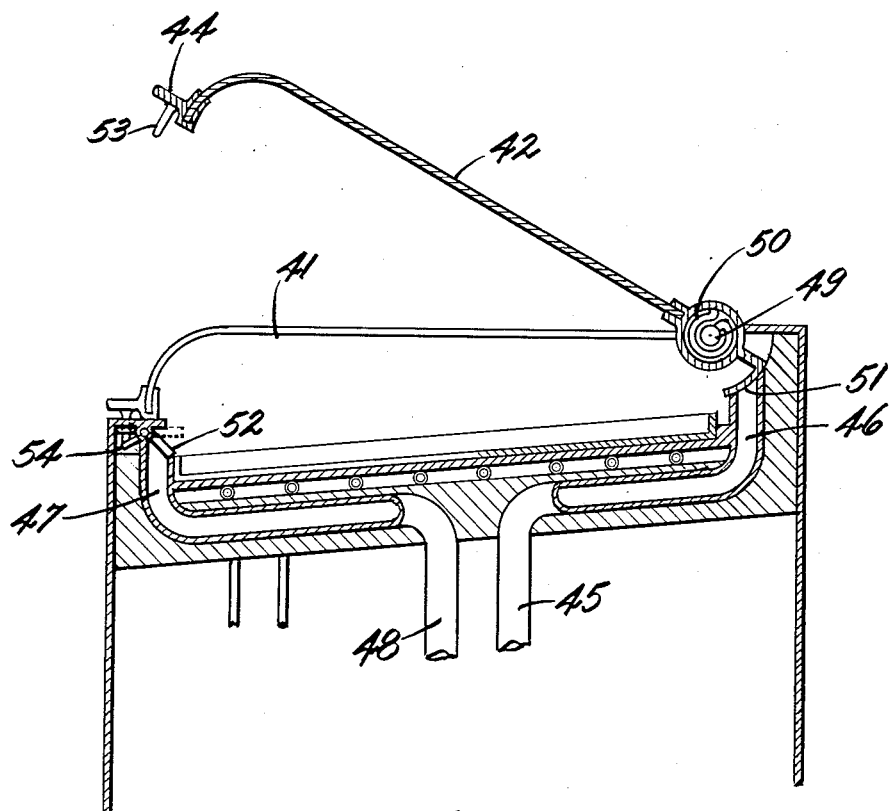
Figure 6 is a section along the line 6—6 of Figure 5.

A display counter body 1 is supported on legs or other supporting means 2. It includes a storage and display chamber 3 closed at the top by a transparent pane or window of glass or other suitable material 4. The body of the counter is insulated and has an insulated floor 5 in which are located a plurality of heat exchange refrigeration tubes 6 in heat exchange contact with a conducting floor 7. A drawer having a front panel 8, a handle 9 and a base plate 10 rests upon the heat exchange plate 7 and is of metal or other heat conducting material. A roller 11 is attached to the inboard end of the base plate 10 adapted to seat in a pocket 12 at the inboard end of the conducting plate 7. A roller 13 is fixed in position at the forward end of the plate 7.

A removable tray 14 is socketed in the plate 10. Access to and removal of this tray may be accomplished by opening the filling door 15 at the rear end of the counter. Each of the trays 14 is upwardly flanged on opposite sides as at 16 and the upper portion of the flange 16 at the inboard end is adapted to engage a fixed roller 17 so that when the drawer is pulled out, its outward excursion is limited by contact of roller 17 and stop 18, the roller 11 rising to travel along the plate 7 for free movement and in the withdrawn position, the drawer being supported on rollers 13 above and held down at its inboard end by roller 17.

The customer wanting to take out something from the counter, pulls the drawer open, takes it out, lets go of the handle and the drawer slides back. The roller 11 drops into the pocket 12 and the bottom of the drawer then in contact with the plate 7 is cooled by heat exchange by the refrigeration tubes.

When the butcher wants to replace what has been withdrawn, he opens the drawer 15, takes out the tray 14 and recharges it.

Referring to Figure 4, 19 is a compressor. 20 is a condenser. An expansion valve 21 and the evaporator coils 22 are associated with heat conductor plates 23. Ducts 24, 25, 26, 27 and 28 join the compressor, condenser, evaporator and heat exchange coils 6 in series. The throttling valve 28a permits adjustment of the operation of the refrigerator to suit the temperature desired by controlling the feed to the compressor. Temperature pickup bulb 27a controls expansion valve 21 so that when the compressor operates, it cools the heat conductor plates 23.

An intake port 30 in one end of the counter is connected with an air duct 31 leading to a motor driven compressor 32 which discharges air under pressure past the fan 33 into the air cooling chamber 34 past the conductor coils 23 to the tubular blade type expander 35, thence discharging cold air 36 through port 37 to the counter thus air is withdrawn from a refrigeration chamber, and without loss of moisture content is compressed, then cooled without loss of moisture content, then caused to expand and do work with great reduction in temperature, and then returned to the chamber in saturated or supersaturated condition.

In the modified form of counter 40 indicates a plurality of heat conducting trays similar to the trays 14 except that they are not withdrawn by the customer. These trays are arranged side by side, being separated by walls 41. Each pocket including the tray between the walls 41 is closed by a transparent lid 42 pivoted at 43 and provided at its front edge with a handle 44. When the customer wishes to take meat or the like from the counter, she takes hold of the handle 44, rotates the lid 42 upwardly and can reach in to take out what she wants, thus a number of customers may help themselves from the counter at the same time and a number of different kinds of product may be displayed. The mechanism disclosed in Figure 4, is, of course, contained within the base.

The walls 41 divide the display area into a series of separate pockets as indicated, each pocket being closed by one of the partitions 41. The cold air enters the counter through the duct 45 leading to a manifold 46. The manifold is ported for discharge into each of the separate pockets. The spent cold air is withdrawn from each pocket through a manifold 47 ported in register with each pocket and thence through a duct 48. The ducts 45 and 48 being the general equivalent of the ducts 31 and 36 of Figure 4 in so far as their operation is concerned. Each lid 42 is pivoted at 49 being separately counterbalanced by a spring 50 and each lid has at its inboard end a valve flange 51 which closes the port through which the manifold 46 discharges into the pocket when the lid is open.

Each pocket has a flap valve 52 biased to the closed position when the lid 42 is open. Thus whenever the customer opens the lids, cold air supply and spent air discharge for that particular pocket is interrupted, thus leaving in the pocket a bath of heavy cold air which is disturbed only by the ambient currents of air or by the customer. As soon as the customer has taken her purchase and allowed the lid 42 to close, the pin 53 on the lid engages the valve tail 54 opening the valve 52 and the flange 51 is rotated away from the closing position so that as long as the lid is closed, cold air enters each pocket and spent air is withdraw from it but whenever the lid is open, this movement of air stops. By this arrangement, there is a minimum loss of cold air and the only time that the contents of the pocket are exposed to ambient air is when the pocket is open and even that exposure is minimized by virtue of the fact that a substantial part of the cold air in the pocket is held in place because it is heavier than ambient air so that the contents of the pocket remains normally immersed in the cold air bath.

A further advantage of this arrangement is that when the pocket is open and the exhaust and intake ports are closed to that pocket, the noise of the air conditioning or air cooling mechanism is eliminated and there is no current of cold air discharging from the pocket into the face of the user.

By this arrangement, the contents of the counter is cooled by direct contact with the tray and also by direct contact with the air circulated through the chamber. The control of temperature of the coil 6 insures that the temperature of the heat exchange cooled counter surface is above the dew point of the air so that no condensation of moisture from the air takes place.

The use and operation of my invention are as follows:

Foodstuffs, especially meat and the like, which must be kept at low temperature protected against contamination and desiccation will be displayed visible to the customer from the front of the counter on a plurality of heat conducting trays. The trays are cooled by heat exchange from the refrigeration mechanism disclosed and tend to cool the foodstuffs or at least tend to prevent rise of temperature of the foodstuffs above the temperature of the tray if the foodstuffs are previously cooled.

A continuous current of cold moist air circulates over the trays of foodstuffs so as to insure that the material on display is not exposed to warm dry air or to air from the sales room.

To maintain the desired cold, moist atmosphere in contact with the foodstuff, each tray is provided with a transparent cover through which the customer can inspect the merchandise. In one instance the tray may be temporarily withdrawn to remove merchandise to be bought. In another instance, the cover may be raised to permit merchandise to be withdrawn. In each case only the tray on which the particular thing the customer wishes to remove will be temporarily exposed to ambient air and as soon as the material has been removed, it will again be insulated from the ambient air.

By this arrangement, the foodstuff is cooled by two separate sources; the cold plate on which it rests being one source of cooling, the moist cold atmosphere around it being the other source of cooling.

By my arrangement the enclosure in which the material is displayed is covered by a series of transparent members so that more than one customer can have access to the interior but at the same time the covers provide means so that when no customer wishes to remove goods, the entire transparent roof or cover will be closed.

No matter how often the cover may be opened or the tray may be withdrawn, the temperature of the food product will not drop below a steady state because temporary removal will be short and because temporary interference with the flow or temperature of the moist atmosphere will be only occasional.

Attention is called to the fact that the cold plate is warmer than the moist cold air or bath to which the food is exposed so that there will be no condensation from the saturated or super saturated air on the cold plate. Under these circumstances, the temperature may be controlled so that temperatures will be slightly above the freezing point of water but the foodstuffs will be exposed to the two temperature control elements, namely—the cold plate and the cold saturated air, thus maintaining optimum storage temperatures with a minimum of desiccation.

I claim:
1. A refrigerator display and sales counter comprising a normally closed chamber, through the top of which material for sale is visible for display, two separate means for refrigerating the material within the chamber including a means for circulating cold, substantially saturated air through the normally closed chamber into contact with the material and a means for refrigerating the surface upon which the material rests for support in the chamber whereby the cold surface is in direct heat exchange relation with the material for transfer of heat thereto by conduction, and means for maintaining the temperature of the supporting surface above the dew point of the cold air circulating through the chamber.

2. A refrigerator display and sales counter comprising a normally closed chamber, through the top of which material for sale is visible for display, two separate means for refrigerating the material within the chamber including a means for circulating cold, substantially saturated air through the normally closed chamber into contact with the material and a means for refrigerating the surface upon which the material rests for support in the chamber whereby the cold surface is in direct heat exchange relation with the material for transfer of heat thereto by conduction, means for maintaining the temperature of the supporting surface above the dew point of the cold air circulating through the chamber, means defining a plurality of display zones side by side, along the length of the chamber, a normally closed port in registry with each display zone, each port being separately adapted to be opened for withdrawal of material from the zone.

3. A refrigerator display and sales counter comprising a normally closed chamber, through the top of which material for sale is visible for display, two separate means for refrigerating the material within the chamber including a means for circulating cold, substantially saturated air through the normally closed chamber into contact with the material and a means for refrigerating the surface upon which the material rests for support in the chamber whereby the cold surface is in direct heat exchange relation with the material for transfer of heat thereto by conduction, means for maintaining the temperature of the supporting surface above the dew point of the cold air circulating through the chamber, a plurality of separate trays of heat-conducting material arranged side by side along the length of the chamber and in surface contact with the supporting surface and on which the material rests, a normally closed port in registry with each tray and each port being separately adapted to be opened for removal of the tray.

4. A refrigerator display and sales counter comprising a normally closed chamber, through the top of which material for sale is visible for display, two separate means for refrigerating the material within the chamber including a means for circulating cold, substantially saturated air through the normally closed chamber into contact with the material and a means for refrigerating the surface upon which the material rests for support in the chamber whereby the cold surface is in direct heat exchange relation with the material for transfer of heat thereto by conduction, means for maintaining the temperature of the supporting surface above the dew point of the cold air circulating through the chamber, a plurality of separate trays arranged in side by side relation along the length of the chamber of the refrigerated supporting surface, a normally closed port in registry with each tray, each port being separately adapted to be opened for removal of the tray, each tray being mounted for longitudinal displacement through the port, means for limiting its excursion and means for supporting the tray in general alignment with its starting position when it has been longitudinally displaced.

5. A refrigerator display and sales counter comprising a normally closed chamber, through the top of which material for sale is visible for display, two separate means for refrigerating the material within the chamber including a means for circulating cold, substantially saturated air through the normally closed chamber into contact with the material and a means for refrigerating the surface upon which the material rests for support in the chamber whereby the cold surface is in direct heat exchange relation with the material for transfer of heat thereto by conduction, means for maintaining the temperature of the supporting surface above the dew point of the cold air circulating through the chamber, a plurality of separate trays of heat-conducting material arranged in side by side relation along the length of the chamber on the refrigerated surface, a normally closed port at the back of the counter in registry with each tray adapted to be opened for withdrawal of the tray from the counter, a port in registry with each tray in front of the counter adapted to be opened to permit the tray to extend forwardly from the counter, means for limiting such forward extension and means for holding the tray in position when so extended.

6. The method of refrigerating and storing perishable material comprising the steps of positioning the material upon the supporting surface of highly thermal conductivity within a normally closed chamber, circulating cold air in a substantially saturated state through the chamber to refrigerate the space in which the material is located, circulating a cold refrigerant in heat conductive relationship with the supporting surface whereby the supporting surface is maintained in a cold state for direct transfer of cold to the material supported thereon, and maintaining the supporting surface at a temperature above the dew point temperature of the cold, substantially saturated air circulating through the chamber.

References Cited in the file of this patent

UNITED STATES PATENTS

| | | |
|---|---|---|
| 2,112,205 | Ahrens | Mar. 22, 1938 |
| 2,136,232 | Bromann | Nov. 8, 1938 |
| 2,425,473 | Hoffman | Aug. 12, 1947 |
| 2,661,604 | Baker | Dec. 8, 1953 |
| 2,754,660 | Morrison | July 17, 1956 |
| 2,765,632 | Miller | Oct. 9, 1956 |
| 2,793,925 | Rosen | May 28, 1957 |